(12) United States Patent
Ernst

(10) Patent No.: US 6,469,989 B1
(45) Date of Patent: Oct. 22, 2002

(54) DATA TRANSMISSION SYSTEM AND A METHOD FOR TRANSMITTING DATA IN SAID SYSTEM

(75) Inventor: Gerhard Ernst, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/141,146

(22) Filed: Aug. 27, 1998

(30) Foreign Application Priority Data

Aug. 30, 1997 (DE) .......................................... 197 37 945

(51) Int. Cl.$^7$ ................................................. H04B 7/26
(52) U.S. Cl. ........................ 370/311; 370/347; 455/343
(58) Field of Search ................................. 370/311, 312, 370/314, 321, 337, 347; 455/343; 340/447, 825.54; 73/146, 146.4, 146.5

(56) References Cited

U.S. PATENT DOCUMENTS

| | | | | |
|---|---|---|---|---|
| 5,058,203 A | * | 10/1991 | Inagami ...................... | 455/343 |
| 5,241,542 A | * | 8/1993 | Natarajan et al. ........... | 370/311 |
| 5,299,117 A | * | 3/1994 | Farnbach .................... | 455/343 |
| 5,392,287 A | * | 2/1995 | Tiedemann, Jr. et al. ... | 370/311 |
| 5,602,524 A | * | 2/1997 | Mock et al. ................. | 340/447 |
| 5,797,132 A | * | 8/1998 | Altwasser ................... | 705/16 |
| 5,808,190 A | * | 9/1998 | Ernst ........................... | 73/146.5 |
| 5,845,204 A | * | 12/1998 | Chapman et al. ........... | 455/343 |
| 6,112,585 A | * | 9/2000 | Schrottle et al. ............ | 73/146 |

FOREIGN PATENT DOCUMENTS

| | | |
|---|---|---|
| DE | 4439074 | 5/1996 |
| EP | 0758768 | 2/1997 |

\* cited by examiner

*Primary Examiner*—Wellington Chin
*Assistant Examiner*—Frank Duong
(74) *Attorney, Agent, or Firm*—Walter Ottesen

(57) ABSTRACT

The invention relates to a method for transmitting data in a data transmission system. The invention also relates to a data transmission system which includes a receiver (2) and at least one transmitter (4*a* to 4*d*). The receiver (2) is operable in a stand-by mode and in a data-receive mode and transfers with the aid of a switch-on signal from the stand-by mode into the data-receive mode. The transmitters (4*a* to 4*d*) transfer, via a data transmission, information to the receiver (2) as to when, after this data transmission, the next data transmission is to be expected from the corresponding transmitter (4*a* to 4*d*). The switch-on signal is generated in the receiver (2) shortly ahead of the time point at which the next data transmission is to be expected from the transmitters (4*a* to 4*d*) so that the receiver (2) transfers from the stand-by mode into the data-receive mode. The time interval at which the receiver (2) is in the data-receive mode can therefore be minimized and therefore the energy consumption of the receiver (2) is minimized.

8 Claims, 6 Drawing Sheets

DATA TRANSMISSION SYSTEM AND A METHOD FOR TRANSMITTING DATA IN SAID SYSTEM

FIELD OF THE INVENTION

The invention relates to a method for transmitting data in a data transmission system which includes a receiver which is from time to time in a stand-by mode and from time to time in a data-receive mode. The receiver can be switched by a switch-on signal from the stand-by mode into the data-receive mode. The data transmission system also includes at least one transmitter which transmits data to the receiver at time intervals. The receiver is in the data-receive mode during data transmission. The invention also is directed to a data transmission system for carrying out the method of the invention.

BACKGROUND OF THE INVENTION

Methods of the kind described above for transmitting data in a data transmission system are known and are applied, for example, in air pressure control systems. Such air pressure control systems are built into a motor vehicle and comprise essentially a central unit and air pressure control devices. Each of the pressure control devices is assigned to a corresponding one of the wheels of the motor vehicle. With the aid of the air pressure control devices, the air pressure in the corresponding tires of the motor vehicle is detected and the air pressure control devices transmit a data message to the central unit at time intervals. Each data transmission includes an individual identifier in addition to the measured air pressure. With the aid of the individual identifier, a check is made in the central unit as to from which wheel position the data transmission was transmitted. In the central unit, it is, for example, stored that the individual identifier III is transmitted from the wheel position "forward left".

The central unit compares the transmitted air pressure values to stored desired air pressure values and a warning is transmitted to the driver of the vehicle when the measured air pressure deviates from the measured desired air pressure by an amount greater than a pregiven quantity. If no announcement is sent to the driver, then this is an indication that the correct air pressure is present in all tires of the motor vehicle.

The measurement of the tire air pressure and the announcement of an incorrect tire air pressure is especially important during travel of the motor vehicle. However, it is likewise important that an announcement is made to the driver when starting the vehicle that the correct air pressure is present in all tires and that the driver may commence driving without danger. The air pressure control devices also measure the air pressure in the tires at time intervals when the vehicle is at standstill and transmit this information to the central unit where the air pressure is checked as to correctness. When the motor vehicle is started, the central unit can reliably indicate to the driver, on the basis of the last-transmitted values, whether the air pressure in all tires of the motor vehicle assumes the correct value. From this, it follows that the central unit must be able to receive the data transmissions of the air pressure control devices even at standstill of the motor vehicle. For this purpose, the central unit must be supplied with energy. At standstill of the motor vehicle, this energy is made available by the vehicle battery which, as a consequence of a longer standstill, is possibly loaded until completely discharged.

Data transmission systems of the above-mentioned type are known wherein the energy consumption of the receiver can be minimized. These data transmission systems contain, for example, an electronic ignition key (transmitter) which sends out a signal having an individual identifier to the receiver in the door of the motor vehicle. The receiver initiates opening of the door if the individual identifier, which is transmitted from the key, belongs to the corresponding motor vehicle. In a data transmission system of this kind, the receiver is in general in a stand-by mode wherein it can receive a base signal from the transmitters, that is, from the ignition keys. When a base signal is received, an amplifier circuit is switched on in the receiver and this amplifier circuit checks whether the received base signal exhibits a vehicle-typical character. If this is the case, then a downstream data evaluation unit in the receiver is switched on which compares the individual identifier transmitted from the ignition key to the individual identifier stored in the receiver and, when there is coincidence, an opening of the door is initiated. The battery supplies the central unit with energy and is sparingly used because the energy-consuming amplifier circuit as well as the energy-consuming data evaluation unit are switched on only as needed.

The method explained in the last paragraph for transmitting data in a data transmission system is not transferrable to air pressure control systems because, as initially mentioned, data is continuously transmitted from the transmitters of an air pressure control system even at standstill of the motor vehicle. If a vehicle equipped with a corresponding air pressure control system is parked, for example, in a large parking lot, then at least the amplifier circuit in the central unit is switched on continuously when applying the above-mentioned method because the central unit would very often receive the base signal from the motor vehicles standing in the immediate area. The energy consumption of the central unit therefore cannot be significantly reduced. Furthermore, it can be determined that the base signal must be transmitted from the transmitters over a certain time span so that the amplifier circuit in the central unit can be switched on. In this way, the battery of the transmitters is, in turn, greatly loaded.

SUMMARY OF THE INVENTION

It is an object of the invention to provide a method for transmitting data in a data transmission system wherein the energy resources of the receiver as well as the energy resources of the transmitters are used sparingly. It is a further object of the invention to provide a data transmission system with which the method of the invention can be carried out. The data transmission system should especially, but not exclusively, be suitable for use in air pressure control systems.

The method of the invention is for transmitting data in a data transmission system which includes: a receiver which is intermittently in a stand-by mode and intermittently in a data-receive mode; at least one transmitter for making a data transmission to the receiver at time intervals; and, means for supplying a switch-on signal to switch the receiver from the stand-by mode to the data-receive mode; and, the receiver being in the data-receive mode during the data transmission. The method of the invention includes the steps of: inputting a message to the receiver as to the time intervals at which the data transmissions are to be expected from the transmitter; on the basis of the message, determining the time point in the receiver at which the next data transmission can be expected from the transmitter measured from after receipt of the last data transmission; and, generating the switch-on signal in the receiver shortly before the time point at which the next data transmission is to be expected.

In the following, the term "data-receive mode" is intended to mean that mode wherein the receiver can receive and completely process the data transmitted by the transmitters. The phrase "shortly before the time point at which the next data transmission is to be expected, the switch-on signal is generated" is understood to mean that the time span between the time point, at which the switch-on signal is generated, and the time point, at which the next data transmission is to be expected, is significantly less (that is, at least by one order of magnitude less) than the time span between two data transmissions of a transmitter. It is further noted that the method for transmitting data in a data transmission system and the data transmission system is explained in connection with an air pressure control system. However, the method as well as the data transmission system can be transferred to all systems wherein data are transmitted from transmitters to a receiver at known time intervals.

The basic idea of the invention is that the receiver of the data transmission system is only switched into the data-receive mode when a data transmission is to be expected from a transmitter and that the switch-on signal, with which the data-receive mode is switched on, is generated in the receiver itself. After reception of the data transmission in the receiver, a switch-off signal is generated in the receiver which transfers the receiver again from the data-receive mode into the stand-by mode.

The advantages achieved by the invention are especially that the receiver of the data transmission system is only then switched on in the data-receive mode when a data transmission is to be expected from a transmitter belonging to the system. The receiver is only then in the energy-consuming data-receive mode when it is absolutely necessary. A further advantage of the invention is that no base signal need be transmitted from the transmitters of the data transmission system with the aid of which the receiver of the data transmission system is transferred into the data-receive mode. Rather, this switch-on signal is generated within the receiver itself and therefore the battery of the transmitters is also sparingly used.

According to a feature of the invention, each transmitter transmits data to the receiver at regular time intervals. The data with respect to the regular time intervals is inputted into the receiver. If the system includes, for example, a transmitter, which transmits a data transmission at regular time intervals of, for example, 60 seconds, to the receiver, then it can be inputted into the receiver during manufacture that data transmissions are to be expected every 60 seconds from the transmitter with which the receiver communicates. If the data transmission system has several transmitters, then each transmitter transmits an identifier (which is individually assigned to the transmitter) with each data transmission. In the receiver, the regular time intervals are stored at which data transmissions are to be expected which contain a specific individual identifier (for example, it is stored in the receiver that a transmitter having the individual identifier A, transmits a data transmission every 60 seconds and the transmitter having the individual identifier B transmits a data transmission every 45 seconds).

According to a feature of the invention, each transmitter sends, at time intervals, data to the receiver and each data transmission contains information at which time intervals the next data transmission is to be expected from a transmitter. In this embodiment too, each transmitter transmits with each data transmission an individual identifier to the receiver when the data transmission system contains several transmitters. The advantage of this embodiment is that it is not necessary to input to the receiver when the next data transmission is to be expected from a specific transmitter because this is given to the receiver from the transmitter. For this reason, it is also very simple to exchange a transmitter in the data transmission system. This is especially important in air pressure control systems because the transmitters there are often exchanged, for example, when changing from summer tires to winter tires.

According to another feature of the invention, the data as to at which time intervals the next data transmission is sent, are generated in the transmitter in accordance with an algorithm. Via the algorithm, a random number is advantageously generated which indicates the time intervals, for example, in seconds. By using an algorithm which generates the random number, it is substantially ensured that the several transmitters of a data transmission system transmit their data transmissions to the receiver always at different time points.

According to another feature of the invention, a comparison is made in the receiver of the time intervals at which the data transmissions are received by the receiver and which time intervals have been indicated by the transmitter. Based on the comparison, a corrective value is computed and stored which permits a time span given by the transmitter to be converted into a time span measured in the receiver. The time span is given by the transmitter. The advantage of this embodiment is that the clocks in the transmitters and in the receiver are calibrated with respect to each other so that the time span from the generation of the input signal in the receiver up to the reception of the data transmission can be minimized. If a transmitter tells the receiver, for example, that the next data transmission is to be expected after 60 seconds and, if in the receiver, a time span of 66 seconds is measured from receipt of the last data transmission to the receipt of the next data transmission from this transmitter, then a corrective value of 1.1 is to be considered by the receiver. If the transmitter provides in the data message, which is received next by the receiver, that the next data message is to be expected after 120 seconds, then the corrective value is considered in the receiver and the receiver knows that with respect to its clock, the next data transmission is to be expected only in 132 seconds. It is sufficient, for example, when the switch-on signal is generated after 131.5 seconds measured with the clock in the receiver in lieu of, for example, after 119.5 seconds which the receiver would use as a basis if it did not consider the corrective value.

According to still another embodiment of the invention, the receiver switches into the data-receive mode and remains there until it receives a new data transmission from a transmitter, if the receiver could not receive a previously expected message from the transmitter. The advantage of this embodiment is that the method can also be further operated when a data transmission from a transmitter is not received. This can, for example, take place when the receiver had switched too late from the stand-by mode into the data-receive mode and, in this way, did not receive the data transmission; or, two or more transmitters transmitted their data transmissions simultaneously to the receiver in a data transmission system having several transmitters. These data transmissions are not separated in the receiver and are therefore not processed.

If the data message of a transmitter contains, for example, the individual identifier A and the information that the next data transmission is transmitted in 45 seconds and if the next data message is not received after 45 seconds by the receiver, then the receiver switches into the data-receive mode until it, in turn, receives a data message which contains the individual identifier A. This data message contains then information as to when the next data message is to be expected so that the receiver can take up its normal mode of operation. If circumstances develop that the receiver cannot receive the data messages from all transmitters at a time interval, then the receiver switches into the data-receive mode until the data messages have been received from all transmitters which have respectively different identifiers.

BRIEF DESCRIPTION OF THE DRAWINGS

The invention will now be described with reference to the drawings wherein.

DESCRIPTION OF THE PREFERRED EMBODIMENTS OF THE INVENTION

Figure 1A:
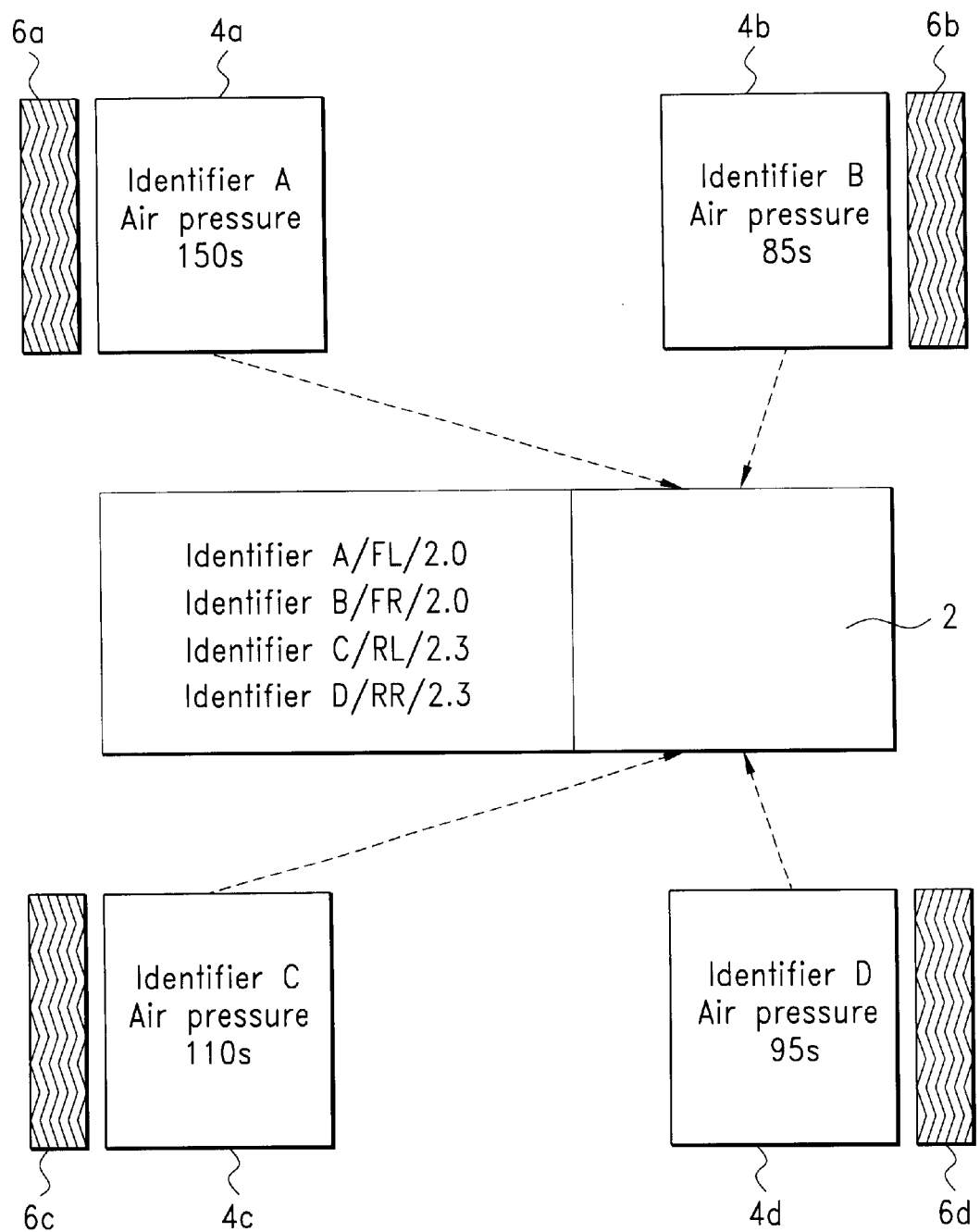
FIGS. 1A to 1C show block diagrams of a data transmission system according to the invention and the system is here shown as an air pressure control system.
Figure 1B:
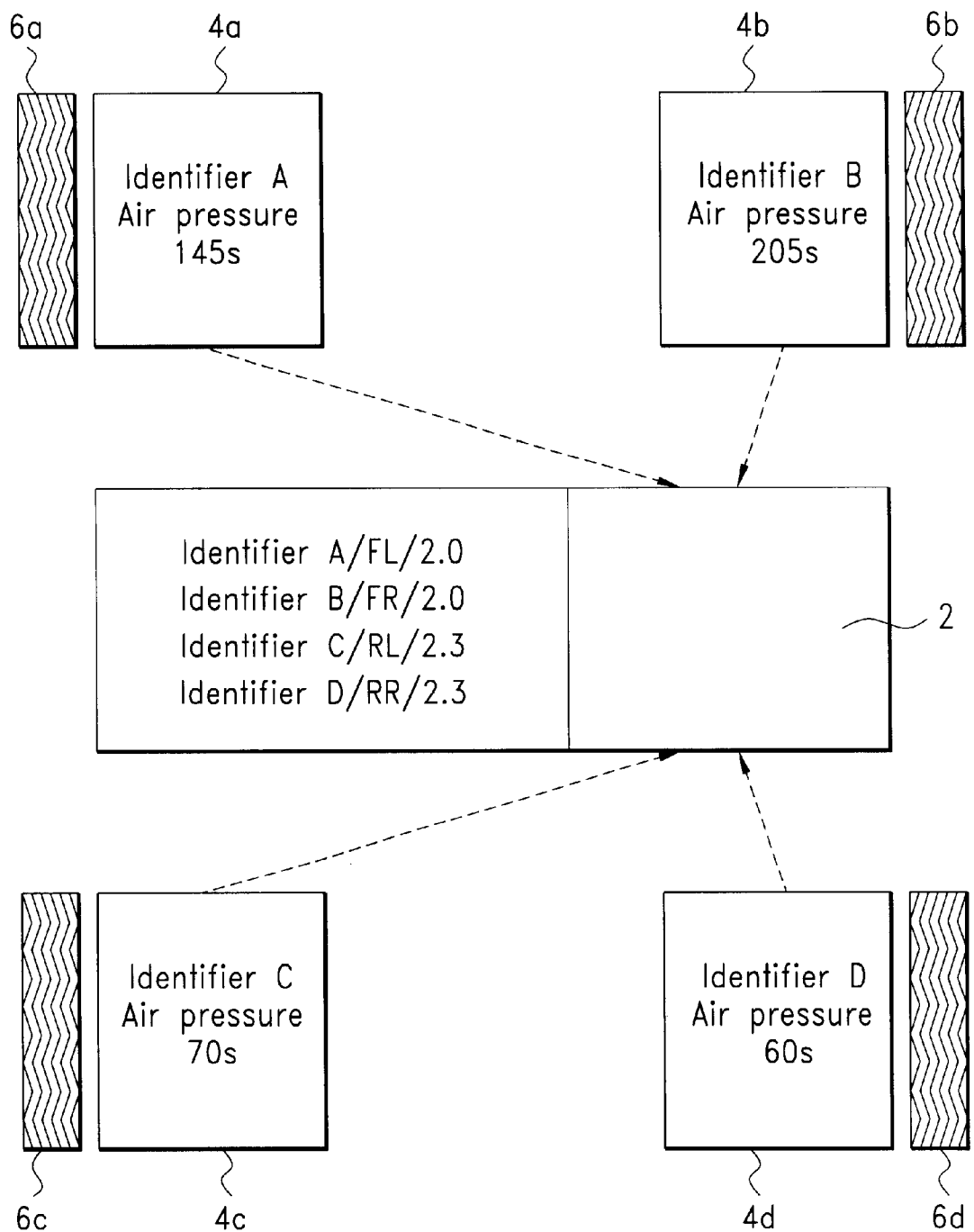
Figure 1C:
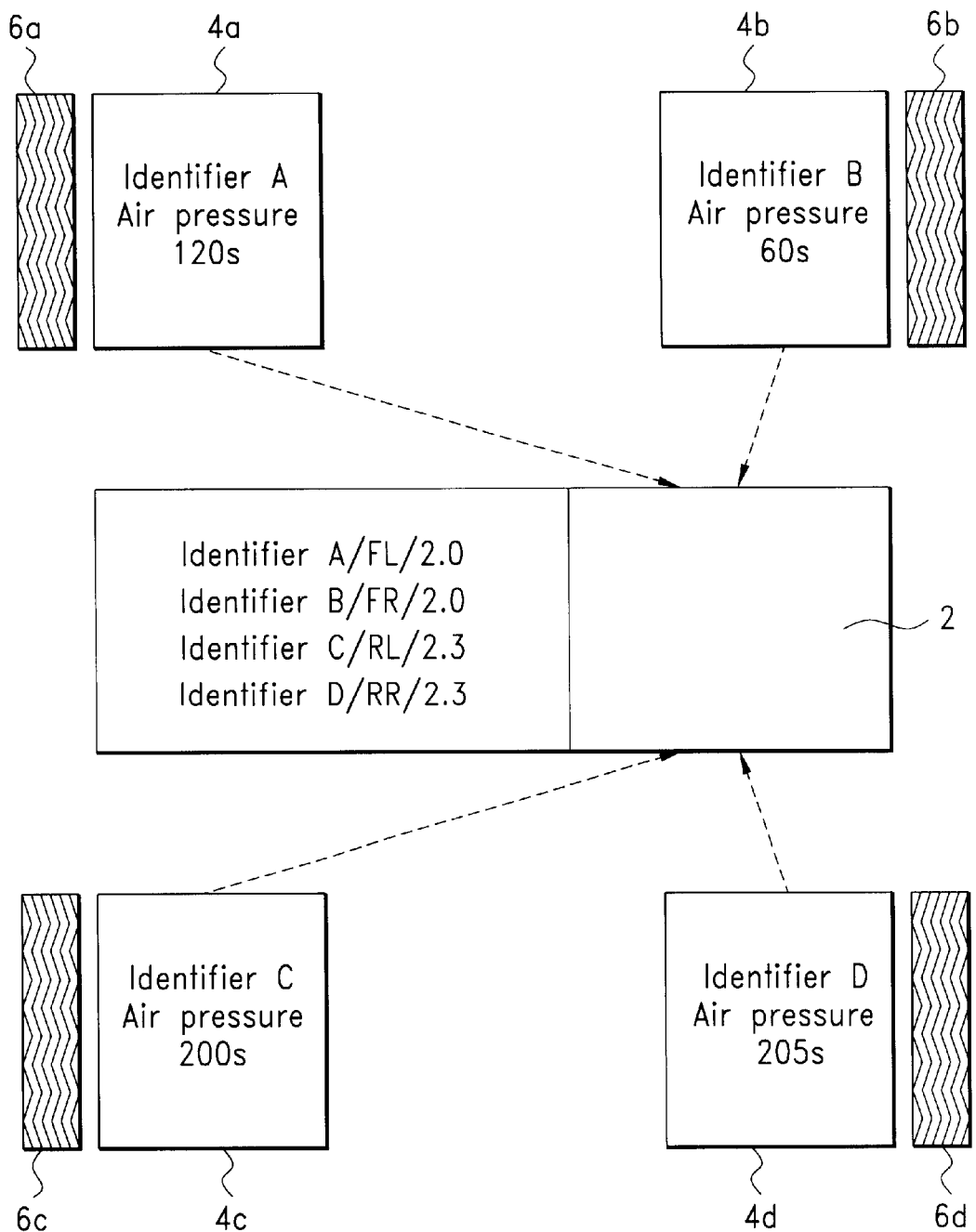

The schematics of FIGS. 1A to 1C show a data transmission system in the form of an air pressure control system in a motor vehicle. The air pressure control system includes a central unit 2 (receiver) and air pressure control devices 4a to 4d corresponding to the respective wheels 6a to 6d of the motor vehicle.

The central unit 2 includes a memory in which an individual identifier is stored together with the position to which the corresponding air pressure control device (4a to 4d) is assigned and with an air pressure which should be present at the tire in this position. The individual identifier is transmitted from one of the air pressure control devices (4a to 4d). In the memory, it is, for example, stored that the individual identifier A is transmitted from the wheel position "forward left" (FL) and that an air pressure of 2.0 bar should be present at this wheel position, et cetera.

Data transmissions are transmitted from the air pressure control devices 4a to 4d to the central unit 2 at time intervals. Each data transmission includes: the identifier of the corresponding air pressure control device 4a to 4d, the air pressure measured at the corresponding wheel position and data as to at which time interval the next data transmission is transmitted relative to the present data transmission. With the transmitted identifier, a determination is made in the central unit as to from which wheel position a data transmission originated and the stored desired pressure value is compared to the transmitted air pressure. If the transmitted air pressure deviates a pregiven amount from the desired air pressure, then the central unit 2 issues a warning to the driver of the motor vehicle with the content that an incorrect air pressure is present at a specific wheel position of the motor vehicle.

The method of transmitting data within the air pressure control system will now be explained in detail in connection with FIGS. 1A to 1C and FIG. 2.

In FIG. 1A, it is assumed that no data are available to the central unit 2 from which it can be determined when the next data transmissions are to be expected. This is the case, for example, in a newly manufactured vehicle. The central unit 2 then switches into the data-receive mode until a data transmission can be received from all air pressure control devices 4a to 4d. All data transmissions of the air pressure control devices 4a to 4d contain data as to when the next data transmission after the present data transmission is to be expected. For this reason, the central unit 2 can generate a switch-off signal when it has received the data transmissions of all air pressure control devices 4a to 4d and, in this way, transfer from the data-receive mode into the stand-by mode. The central unit knows that a data transmission has been transmitted to it from all air pressure control devices 4a to 4d when it has received a number of data transmissions in which all individual identifiers A to D (which are stored in the central unit 2) are received.

The example shown in FIG. 1A will now be explained.

At a specific time point, a data transmission is transmitted from the air pressure control device 4a to the central unit and this data transmission includes the identifier A, the air pressure measured in the tire 6a and data as to when the next data transmission from the air pressure control device 4a to the central unit is transmitted after the present data transmission. In this case, the next data transmission is transmitted 150 seconds after the present data transmission. At another time point, the air pressure control device 4b transmits a data transmission to the central unit 2 which includes like data. The information as to when the next data transmission after the present data transmission is transmitted from the air pressure control device 4b is 85 seconds. At another time point, the air pressure control device 4c transmits a data transmission to the central unit 2 which contains data analog to the data transmission of the air pressure control device 4a. The time interval until the next data transmission is here given as 110 seconds.

At a later time point, the air pressure control device 4d transmits a data transmission to the central unit 2 which likewise contains data analogous to the data transmission of the air pressure control device 4a. The time interval until the next data transmission is here given as 95 seconds.

A switch-off signal is generated in the central unit 2 after the central unit 2 has received a data transmission from each air pressure control device 4a to 4d with information as to at which time interval (measured from the last data transmission) the next data transmission is expected from the corresponding air pressure control device 4a to 4d. This leads to the situation that the central unit transfers from the data-receive mode into the stand-by mode (see FIG. 2). The data transmissions of all four air pressure control devices are received in the selected example within approximately 120 seconds in the sequence A, B, C and D.

Figure 2:
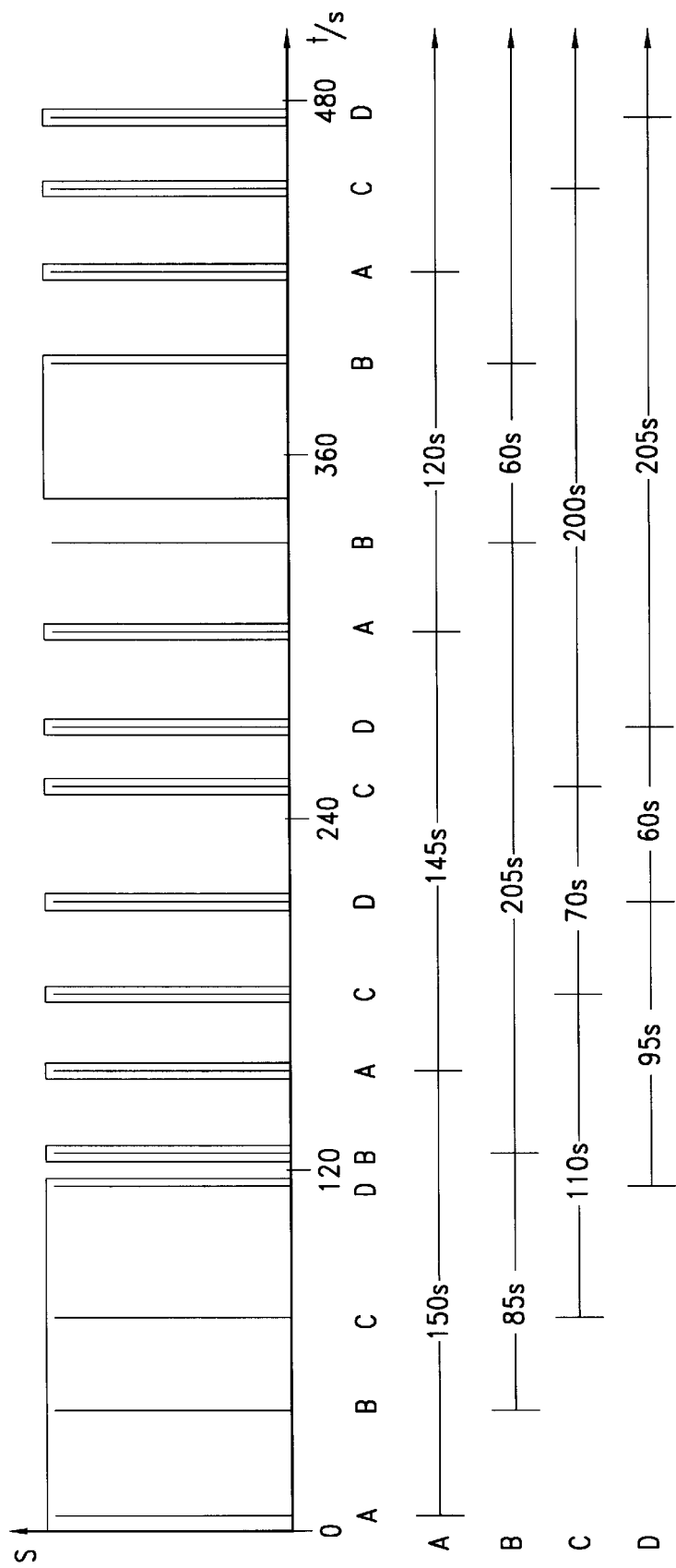
FIG. 2 is a plot of the transmission signal S for each of the air pressure control devices plotted as a function of time.

FIG. 2 will now be explained. A bar on the horizontal time axis means that at the time point at which the bar stands, a data transmission is received by the central unit 2. Below the bar, an indication is provided as to from which air pressure control device 4a to 4d the data transmission originates which can be seen because of the individual identifiers A, B, C and D. A time graph is drawn for each air pressure control device below the diagram showing the plot of the signal received by the central unit 2 as a function of time. From this time graph, it can be seen when the next data transmission is to be expected in the central unit 2 after the receipt of the last data transmission.

In the central unit 2 and shortly before the time point at which the next data transmission is expected from one of the air pressure control devices 4a to 4d, a switch-on signal is generated with which the central unit 2 is transferred from the stand-by mode into the data-receive mode. The first time, the switch-on signal is generated in the central unit 2 shortly before the elapse of 85 seconds which had been given as the time interval in the data transmission which were transmitted from the air pressure control device 4b to the central unit 2 (see FIG. 1A). The central unit 2 waits in the data-receive mode after the generation of the switch-on signal until it receives a new data transmission from the air pressure control device 4b which, in turn, contains information as to when the next data transmission is expected after the present received data transmission (that is, after 205 additional seconds, see FIG. 1B).

After receiving the data transmission of the air pressure control device 4b, the switch-off signal is generated in the central unit 2 so that the central unit 2 again transfers from the data-receive mode into the stand-by mode. In the same way, a switch-on signal is always then generated by the central unit when, a short time later, a data transmission is to be expected from one of the air pressure control devices 4a, 4c and 4d. These data transmissions also include information as to when the next data transmission is to be expected after the present data transmission, that is, after 145 seconds or 180 seconds or 210 seconds (see FIG. 1B and FIG. 2).

The situation can occur that the central unit 2 cannot receive one of the expected data transmissions. This can, for example, be caused by the situation that the switch-on signal is generated too late in the central unit 2 and the central unit 2 therefore transfers too late into the data-receive mode. Another possibility could be that two of the air pressure control devices 4a to 4d by chance transmit a data message to the central unit 2 simultaneously so that the data transmissions cannot be processed by the central unit 2. If such a case occurs, then the central unit 2 remains in the data-receive mode until it receives a new data message from the corresponding air pressure control devices which contains revised information as to at which time interval from the present data transmission the next data transmission from the corresponding air pressure control device is to be expected.

The above too is explained with an example. 205 seconds after a last data transmission of the air pressure control device 4b, the central unit 2 expects the next data transmission of this air pressure control device. For any reason, the situation can occur that the switch-on signal is generated too late in the central unit 2 so that the expected data transmission cannot be received. In this case, the central unit 2 remains in the data-receive mode until the next data transmission of the air pressure control device 4b (which is recognized by the individual identifier B) is received. In the embodiment shown, this is the case after an additional 60 seconds. The renewed data transmission, in turn, contains an information as to whether the next data transmission after the present data transmission is to be expected so that the central unit 2 again has all necessary information for the further execution of the method. Directly after the receipt of the data transmission from the air pressure control device 4b, the switch-off signal is generated in the central unit 2 and the central unit 2 is thereby transferred into the stand-by mode.

Figure 3:
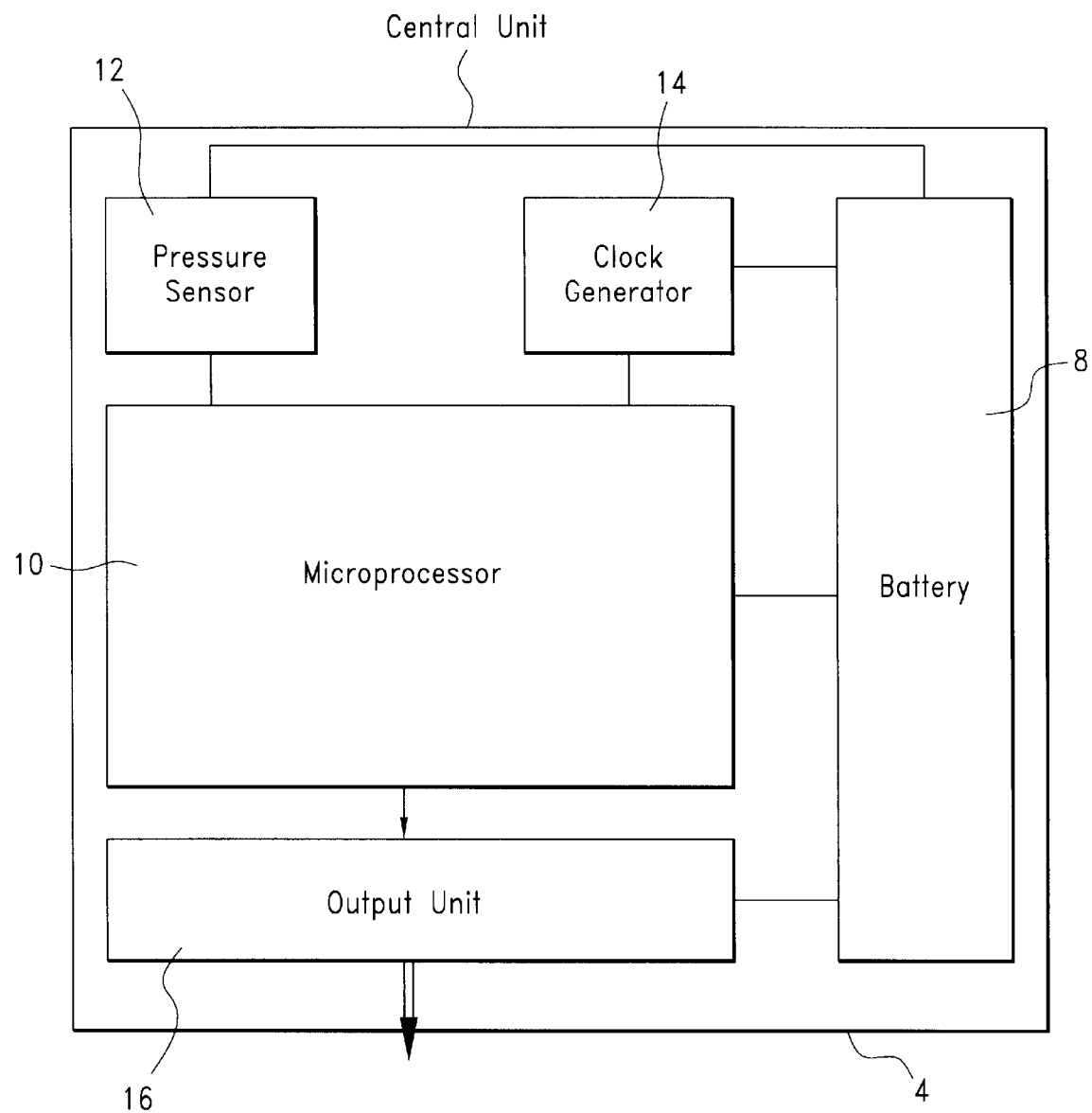
FIG. 3 is a block diagram of an air pressure control device.

FIG. 3 is a schematic showing the configuration of an air pressure control device 4 which has a microprocessor 10, a pressure sensor 12, a clock generator 14 and an output unit 16. All mentioned components 10 to 16 are supplied with energy from a battery 8. With the aid of the pressure sensor 12, the air pressure within the tire of the motor vehicle is measured (that is, the tire which is assigned to the air pressure control device 4) and the measured pressure value is transmitted to the microprocessor 10. With the aid of the clock generator 14, the clock frequency of the microprocessor 10 is pregiven and the clock generator 14 is used as a time clock in that the clock pulses, which are outputted from the clock generator 14, are counted by the microprocessor. The microprocessor 10 includes a memory wherein an algorithm is programmed with the aid of which random numbers can be generated. The last generated random number is transmitted to the central unit 2 together with the last-mentioned pressure and the identifier likewise stored in the microprocessor 10. Furthermore, the last generated random number is stored and the next data transmission is then transferred from the air pressure control device when the time has elapsed which is pregiven by the random number in seconds. In the time interval between the present data transmission and the next data transmission, a new random number is generated in the microprocessor 10 with the aid of the stored algorithm and likewise stored. If the random number generated is, for example, 60 and is stored, this means that in the present data transmission, the time information of 60 seconds is transmitted and the next data transmission is transmitted to the central unit 2 after 60 seconds. If the clock generator 14 of the microprocessor 10 gives a clock frequency of, for example, 50 Hz, then the next data transmission is transmitted after 3,000 clock pulses to the central unit 2 initiated by the microprocessor 10.

Figure 4:
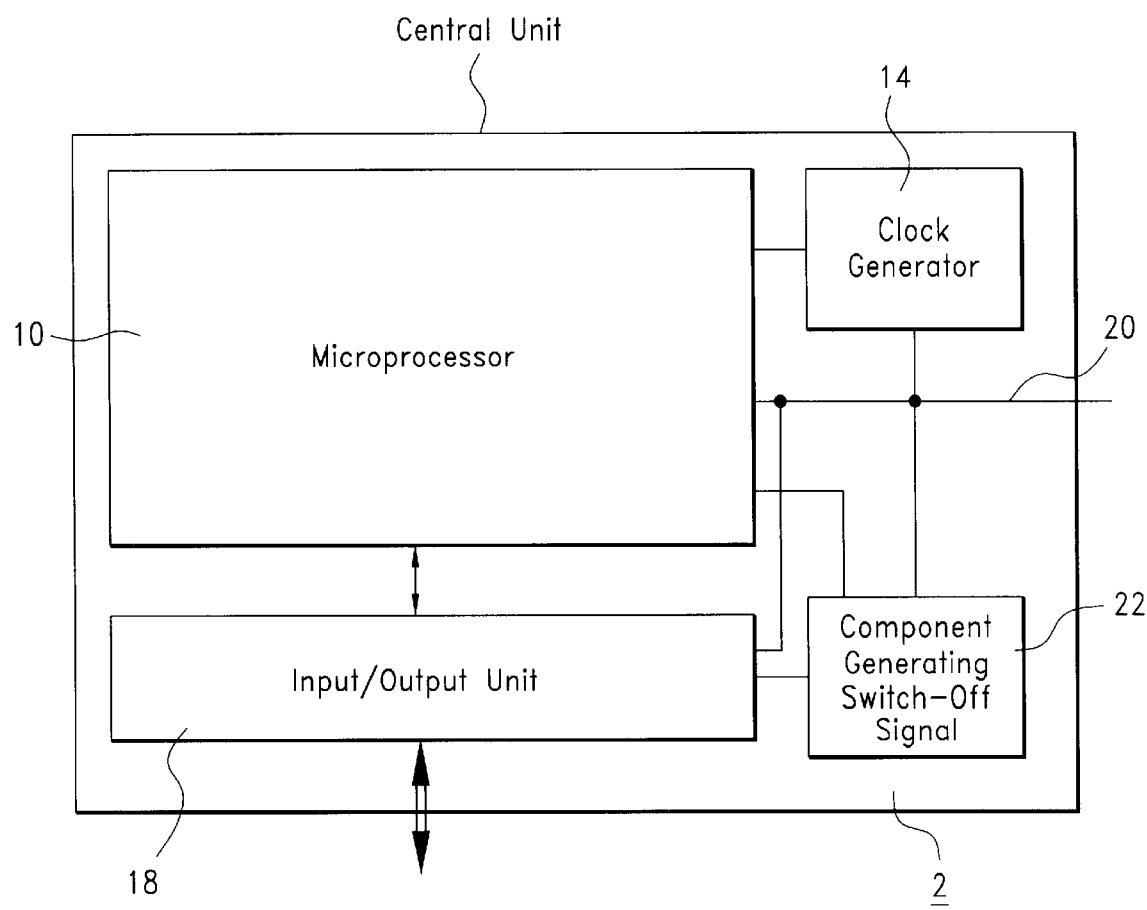
FIG. 4 is a block diagram of a central unit.

FIG. 4 shows a schematic of the central unit 2 which likewise includes a microprocessor 10, a clock generator 14 and an input/output unit 18. The above-mentioned components are supplied with energy from an external battery via line 20. With the aid of the input/output unit 18, the central unit 2 receives the data transmissions transmitted by the air pressure control devices 4a to 4d and transmits these messages further to the microprocessor 10 where they are evaluated. The microprocessor 10 takes, for example, the information from a present data transmission that the next data transmission is to be expected from the corresponding air pressure control device 4a to 4d in 60 seconds. If the microprocessor 10 likewise operates at a frequency of 50 Hz, this means that the next data transmission of the corresponding air pressure control device 4a to 4d is to be expected in 3,000 clock pulses. Directly after receiving the present data transmission, a switch-off signal is generated by the component 22 with which the central unit 2 is transferred from the data-receive mode into the stand-by mode. In the stand-by mode, the central unit 2 only consumes a small amount of energy because then no data has to be received and processed; instead, only the clock signal pregiven by the clock generator 14 must be counted. Shortly before the next data transmission from the air pressure control devices 4a to 4d is expected, a switch-on signal is generated by the component 22 via which the central unit 2 is transferred from the stand-by mode into the data-receive mode. If the next data transmission is expected after 3,000 clock pulses, then the transfer can, for example, take place when 2,980 clock pulses are counted in the microprocessor 10. After 20 additional clock pulses, the next data transmission of the corresponding air pressure control device 4a to 4d is received.

Because of cycle differences of the timers in the air pressure control device 4 or in the central unit 2, the situation can occur that different absolute times are measured in the air pressure control device 4 or in the central unit 2. Thus, the situation can, for example, develop that in the microprocessor 10 with respect to the above-mentioned example, not 3,000 clock pulses are counted until the receipt of the next data transmission but, for example, 3,300 pulses are counted. Since the air pressure control device 4 has transmitted the data transmission after 3,000 clock pulses counted within the air pressure control device 4, the central unit can conclude from this that the time data, which is transmitted from the air pressure control device 4, must be multiplied by 1.1 in order to obtain a synchronization of the clocks in the central unit 2 and in the corresponding air pressure control device.

If it is outputted by the corresponding air pressure control device that, for example, the next data transmission is to be expected in 120 seconds, this means, in the selected example, that the central unit must prepare for the next data transmission only after 132 seconds or 6,600 clock pulses. It is, for example, sufficient when the switch-on signal is generated by component 22 6,580 clock pulses after receipt of the last data transmission.

It is understood that the foregoing description is that of the preferred embodiments of the invention and that various changes and modifications may be made thereto without departing from the spirit and scope of the invention as defined in the appended claims.

What is claimed is:

1. A method of transmitting data in a data transmission system which includes: a central unit which is intermittently in a stand-by mode and intermittently in a data-receive mode; a plurality of transmitters for sending data transmissions to said central unit at time intervals; and, means for generating a switch-on signal to switch said central unit from said stand-by mode into said data-receive mode; and, said central unit being in said data-receive mode during said data transmission; the method comprising the steps of:

causing each one of said transmitters to send data transmissions to said central unit at time intervals and each of said data transmissions containing information as to at which time interval the next data transmission is to be expected from said one transmitter;

on the basis of said information, determining a time point in said central unit at which, after receipt of a data transmission of one of said transmitters, the next data transmission can be expected from said one of said transmitters; and, generating said switch-on signal in said central unit shortly before the time point at which the next data transmission is to be expected.

2. The method of claim 1, further comprising the step of causing each one of said transmitters to send data transmissions to said central unit at regular time intervals.

3. The method of claim 1, wherein the information as to at which time interval the next message is sent is generated in the transmitter in accordance with an algorithm.

4. The method of claim 1, wherein the method further comprises causing said central unit to switch itself into said data-receive mode when said central unit could not receive a previously expected data transmission from one of said transmitters and to remain in said data-receive mode until said central unit receives a new data transmission from said one transmitter.

5. A method of transmitting data in a data transmission system which includes: a central unit which is intermittently in a stand-by mode and intermittently in a data-receive mode; a plurality of transmitters for sending data transmissions to said central unit at time intervals; and, means for generating a switch-on signal to switch said central unit from said stand-by mode into said data-receive mode; and, said central unit being in said data-receive mode during said data transmission; the method comprising the steps of:

causing each one of said transmitters to send data transmissions to said central unit at time intervals and each of said data transmissions containing information as to at which time interval the next data transmission is to be expected from said one transmitter;

on the basis of said information, determining a time point in said central unit at which, after receipt of a data transmission of one of said transmitters, the next data transmission can be expected from said one of said transmitters;

generating said switch-on signal in said central unit shortly before the time point at which the next data transmission is to be expected; and, computing and storing a corrective value in said central unit on the basis of a comparison of the time intervals at which said data transmissions are received in said central unit and which time intervals are given by the transmitter; and, wherein said corrective value permits a time interval given by the transmitter to be converted into a time interval measured in said central unit.

6. A data transmission system comprising:

a central unit which is intermittently in a stand-by mode and intermittently in a data-receive mode;

a plurality of transmitters for sending data transmissions to said central unit at time intervals;

each of said data transmissions containing information as to at which time interval the next data transmission is to be expected from one of said transmitters;

said central unit including a clock with which, on the basis of said information, a time point can be determined at which, after receipt of a data transmission of one of said transmitters, the next data transmission can be expected from said transmitter;

means for generating a switch-on signal to switch said central unit from said stand-by mode into said data-receive mode and said central unit being in said data-receive mode during the data transmission; and, each of said transmitters including a clock with which a determination can be made as to when, after a data transmission, the next data transmission is to be sent.

7. The data transmission system of claim 6, wherein an algorithm is implemented in each of said transmitters.

8. The data transmission system of claim 7, wherein said algorithm generates a random number.

* * * * *